United States Patent
Lu et al.

(10) Patent No.: US 10,990,957 B2
(45) Date of Patent: Apr. 27, 2021

(54) SCAN AND PAY METHOD AND DEVICE UTILIZED IN MOBILE APPARATUS

(71) Applicant: ADVANCED NEW TECHNOLOGIES CO., LTD., Grand Cayman (KY)

(72) Inventors: Yicheng Lu, Hangzhou (CN); Shuai Chen, Hangzhou (CN); Tao Chen, Hangzhou (CN); Jupeng Xia, Hangzhou (CN); Ning Wang, Hangzhou (CN)

(73) Assignee: ADVANCED NEW TECHNOLOGIES CO., LTD., Grand Cayman (KY)

( * ) Notice: Subject to any disclaimer, the term of this patent is extended or adjusted under 35 U.S.C. 154(b) by 12 days.

(21) Appl. No.: 16/400,550

(22) Filed: May 1, 2019

(65) Prior Publication Data
US 2019/0259021 A1     Aug. 22, 2019

Related U.S. Application Data

(63) Continuation of application No. PCT/CN2017/118277, filed on Dec. 25, 2017.

(30) Foreign Application Priority Data

Jan. 3, 2017    (CN) .......................... 201710001426.2

(51) Int. Cl.
    *G06Q 20/32*        (2012.01)
    *G06Q 20/40*        (2012.01)

(52) U.S. Cl.
    CPC ......... *G06Q 20/3274* (2013.01); *G06Q 20/32* (2013.01); *G06Q 20/40* (2013.01); *G06Q 20/40145* (2013.01)

(58) Field of Classification Search
    CPC ............................... G06Q 20/32; G06Q 20/40
                                       (Continued)

(56) References Cited

U.S. PATENT DOCUMENTS 6,430,305 B1 * 8/2002 Decker ................ G06K 9/6292
                                                               340/5.41
7,379,921 B1    5/2008   Kiliccote
(Continued)

FOREIGN PATENT DOCUMENTS

CN        101958025 A      1/2011
CN        102609837 A      7/2012
(Continued)

OTHER PUBLICATIONS

First Office Action and First Search for Taiwanese Application No. 106139460, dated Mar. 29, 2019, 8 pages.
(Continued)

*Primary Examiner* — Robert R Niquette

(57) ABSTRACT

Methods, systems, and apparatus, including computer programs encoded on computer storage media, for a scan-to-pay method are provided. One of the methods includes: receiving a payment request from an operator of a mobile device; and generating a payment code based on the payment request, wherein the payment code comprises first information and second information, with the first information associated with an payment account, and the second information associated with at least one recent behavioral biometric signature of the operator and at least one historical behavioral biometric signature recorded in the mobile device. This scan-to-pay method provides robust risk control with substantially reduced cost, therefore it provides a more friendly user experience on a scan-to-pay application over its conventional counterparts.

17 Claims, 3 Drawing Sheets

--- receive a payment request from an operator of a mobile device    — 101 generate a payment code based on the payment request    — 102

(58) Field of Classification Search
USPC .................................................. 705/35–45
See application file for complete search history.

(56) References Cited

U.S. PATENT DOCUMENTS

| | | | |
|---|---|---|---|
| 7,483,858 | B2 | 1/2009 | Foran et al. |
| 8,380,177 | B2 | 2/2013 | Laracey |
| 8,666,893 | B1* | 3/2014 | Jones ................ G06Q 40/02 705/44 |
| 9,240,005 | B2 | 1/2016 | Mestré et al. |
| 9,785,943 | B2 | 10/2017 | Phillips et al. |
| 2002/0073027 | A1 | 6/2002 | Hui et al. |
| 2004/0257197 | A1* | 12/2004 | Beenau ................ G06Q 20/32 340/5.53 |
| 2006/0000891 | A1* | 1/2006 | Bonalle ................ G07C 9/27 235/380 |
| 2006/0206709 | A1 | 9/2006 | Labrou et al. |
| 2007/0260558 | A1* | 11/2007 | Look ................ G06Q 20/20 705/76 |
| 2008/0133351 | A1 | 6/2008 | White et al. |
| 2009/0254479 | A1 | 10/2009 | Pharris |
| 2010/0138344 | A1* | 6/2010 | Wong ................ G06Q 20/40 705/44 |
| 2010/0299258 | A1* | 11/2010 | Page ................ G06Q 20/042 705/44 |
| 2011/0033090 | A1 | 2/2011 | Baughman et al. |
| 2011/0153497 | A1* | 6/2011 | Determan ................ G06F 21/32 705/44 |
| 2011/0202453 | A1 | 8/2011 | Issa et al. |
| 2012/0084200 | A1 | 4/2012 | Triana |
| 2012/0143722 | A1 | 6/2012 | John |
| 2013/0159186 | A1 | 6/2013 | Brudnicki et al. |
| 2013/0191275 | A1 | 7/2013 | Li et al. |
| 2013/0240622 | A1 | 9/2013 | Zhou et al. |
| 2014/0316984 | A1 | 10/2014 | Schwartz |
| 2015/0039507 | A1 | 2/2015 | Wu |
| 2015/0120547 | A1* | 4/2015 | Ghosh ................ G06Q 20/40145 705/44 |
| 2015/0269577 | A1* | 9/2015 | Avegliano ................ G06Q 20/322 705/44 |
| 2015/0363785 | A1* | 12/2015 | Perez ................ G06Q 20/206 705/44 |
| 2016/0028724 | A1 | 1/2016 | Gillett et al. |
| 2016/0110718 | A1* | 4/2016 | Jajara ................ G06Q 20/4016 705/44 |
| 2016/0132864 | A1 | 5/2016 | Barrese et al. |
| 2016/0162901 | A1* | 6/2016 | Einhorn ................ G06Q 20/4014 705/44 |
| 2016/0189149 | A1* | 6/2016 | MacLaurin ................ G06Q 20/40145 705/44 |
| 2017/0011405 | A1* | 1/2017 | Pandey ................ G06Q 20/40145 |
| 2017/0357981 | A1* | 12/2017 | Azzam ................ G06Q 20/204 |
| 2018/0012227 | A1* | 1/2018 | Tunnell ................ G06Q 20/4014 |
| 2018/0068290 | A1 | 3/2018 | Xia |
| 2018/0150846 | A1* | 5/2018 | Maheshwari ................ G06Q 20/322 |
| 2018/0176727 | A1* | 6/2018 | Williams ................ A61B 5/747 |

FOREIGN PATENT DOCUMENTS

| | | |
|---|---|---|
| CN | 101025806 B | 9/2012 |
| CN | 103745397 A | 4/2014 |
| CN | 103955637 A | 7/2014 |
| CN | 104348825 A | 2/2015 |
| CN | 104835040 A | 8/2015 |
| CN | 105164707 A | 12/2015 |
| CN | 105243539 A | 1/2016 |
| CN | 105740666 A | 7/2016 |
| CN | 105740667 A | 7/2016 |
| CN | 205608764 U | 9/2016 |
| CN | 106127461 A | 11/2016 |
| JP | 2004-258845 A | 9/2004 |
| JP | 2009-301440 A | 12/2009 |
| JP | 2010-97467 A | 4/2010 |
| JP | 2005-208822 A | 8/2015 |
| JP | 2015-176233 A | 10/2015 |
| KR | 1020060132763 A | 12/2006 |
| KR | 10-2009-0005336 A | 1/2009 |
| RU | 2014129856 A | 2/2016 |
| TW | I553568 B | 10/2016 |
| TW | 201701205 A | 1/2017 |
| TW | I584210 B | 5/2017 |
| WO | 2012113189 A1 | 8/2012 |
| WO | 2013023499 A1 | 2/2013 |
| WO | 2015/157021 A1 | 12/2016 |
| WO | 2016/188281 A1 | 12/2016 |

OTHER PUBLICATIONS

Written Opinion of the International Searching Authority and International Search Report for International PCT Application No. PCT/CN2017/118277, dated Mar. 28, 2018, 12 pages.
International Preliminary Report on Patentability for International PCT Application No. PCT/CN2017/118277, dated Jul. 18, 2019, 9 pages.
Examination Report No. 1 for Australian Application No. 2017390725 dated Jan. 21, 2020.
First Search Report for Chinese Application No. 201710001426.2 dated Jan. 14, 2020.
First Office Action for Chinese Application No. 201710001426.2 dated Feb. 3, 2020.
Notice of Allowance for Korean Application No. 10-2019-7015667 dated Jun. 23, 2020.
Office Action for Japanese Application No. 2019-529606 dated May 26, 2020.
Second Examination Report for Australian Application No. 2017390725 dated Jun. 26, 2020.
Office Action and Search Report for Russian Application No. 2019114212 dated Feb. 21, 2020.
Search Report for European Application No. 17889771.6 dated Apr. 24, 2020.
Second Office Action for Chinese Application No. 201710001426.2 dated Apr. 13, 2020.

* cited by examiner

SCAN AND PAY METHOD AND DEVICE UTILIZED IN MOBILE APPARATUS

CROSS-REFERENCE TO RELATED APPLICATIONS

This application is a continuation application of International Patent Application No. PCT/CN2017/118277, filed on Dec. 25, 2017, which is based on and claims priority to the Chinese Patent Application No. 201710001426.2, filed on Jan. 3, 2017 and entitled "SCAN AND PAY METHOD AND DEVICE UTILIZED IN MOBILE APPARATUS." The above-referenced applications are incorporated herein by reference in their entirety.

TECHNICAL FIELD

This application relates generally to Internet technologies, and more specifically, to a scan-to-pay method and related devices.

BACKGROUND

Offline scan-to-pay has gradually become a mainstream payment method. A conventional offline scan-to-pay method typically comprises the following steps: first, upon a payment request, a payment code is generated on a client; second, a merchant reads the payment code on the client using a scanning device to obtain transaction information; third, the transaction information is uploaded to a server via the merchant's network; fourth, the server performs risk control; and fifth, depending on an outcome of the risk control, the server either requests further online identity verification, or approves the payment request.

To ensure satisfying user experiences, an offline payment method should possess the following three characteristics: first, the transaction speed should be fast. Consequently, a typical goal in developing an offline payment method is to ensure a short transaction time. Second, the amount of data to be transmitted should be kept at a minimum, since an offline payment will frequently happen in an environment with limited network connection, which is capable of transmitting only a small amount of data. For example, in an offline payment process, a mobile device may transmit a payment code generated by a client to a merchant scanning device. However, doing so would generate substantial network traffic and would post a challenge to a subsequent risk control process due to limited network capability. Third, each payment needs to go through a real-time risk control process to ensure its security.

In a conventional offline payment method, a tradeoff needs to be made between enhancing payment security (which prolongs the transaction time) and enhancing user experience (which demands a short transaction time). Since each individual risk control process typically requires a large amount of computing and networking resource, user experience of the offline payment will be adversely affected.

SUMMARY

In view of the limitations specified above, a scan-to-pay method and related devices are provided to address the problem of conventional offline payment methods that risk control processes take too much time and consume too much resources.

The embodiments of the specification provide a scan-to-pay method for a mobile device. In some embodiments, the method comprises receiving a payment request from an operator of the mobile device and generating a payment code based on the payment request. In some embodiments, the payment code comprises first information and second information, with the first information associated with a payment account, and the second information associated with at least one recent behavioral biometric signature of the operator and at least one historical behavioral biometric signature recorded in the mobile device.

Additionally, the embodiments of this specification provide a device comprising one or more processors and one or more non-transitory machine-readable memories coupled to the one or more processors and configured with instructions executable by the one or more processors to cause the device to perform the following operations: receiving a payment request from an operator of a mobile device and generating a payment code based on the payment request. The payment code comprises first information and second information, with the first information associated with a payment account, and the second information associated with at least one recent behavioral biometric signature of the operator and at least one historical behavioral biometric signature recorded in the mobile device.

Additionally, the embodiments of this specification further present a risk control method, including obtaining a payment code from the mobile device. The payment code comprises first information and second information, with the first information associated with a payment account, and the second information associated with at least one recent behavioral biometric signature of an operator of the mobile device and at least one historical behavioral biometric signature recorded in the mobile device. The method may further include determining whether to activate a server-side risk control process based on the second information.

Additionally, the embodiments of this specification further provide a scan and pay device on a mobile device. The device comprises a receiving unit for receiving a payment request of an operator of the mobile device and a generating unit for generating a payment code based on the payment request. The payment code at least comprises first information associated with a payment account and second information associated with at least one behavioral biometric signature of the operator and at least one historical behavioral biometric signature recorded in the mobile device.

The embodiments of the specification further provide a risk control method utilized for performing scan and pay in a mobile device. In some embodiments, the method comprises obtaining a payment code provided by the mobile device. The payment code at least comprises first information associated with a payment account and second information associated with at least one behavioral biometric signature of an operator of the mobile device and at least one historical behavioral biometric signature recorded in the mobile device. The method may further comprise determining whether to activate risk control identification of a server based on the second information comprised in the payment code.

Additionally, this specification further provides a risk control device for performing scan and pay in a mobile device, the device comprises an obtaining unit for obtaining a payment code provided by the mobile device. The payment code comprises first information associated with a payment account and second information associated with at least one behavioral biometric signature of an operator of the mobile device and at least one historical behavioral biometric signature recorded in the mobile device. The device may further includes a risk control processing unit for determining whether to activate risk control identification of a server based on the second information comprised in the payment code.

The embodiments described above can achieve the following technical advantages.

First, they provide more reliable risk control results. In this application, a determination result based on behavioral biological information of an operator is encoded into a payment code and transmitted to a server for risk assessment. Compared to conventional risk control processes, the risk control system of this application evaluates the risk based on more comprehensive data, and therefore provides more accurate results.

Second, they reduce the cost associated with the risk control process. Compared to conventional server-side risk control processes, the risk control processes of this application first makes a risk assessment based on behavioral biological information of the operator, and the server-side risk control process is required only if the risk assessment indicates that the operator may not be the account owner. Therefore, networking and computing resource needed on the server can be substantially reduced.

Third, they provide a faster processing speed than its conventional counterparts. In the risk control processes of this application, the risk assessment based on behavioral biological information of the operator may be performed on a local terminal, and a server-side risk control process is necessary only if the risk assessment returns unfavorable results, therefore compare to conventional server-side risk control processes, the risk control processes of this application can be performed much faster.

Fourth, as a result of the advantages described above, the overall efficiency of the risk control processes can be substantially improved.

BRIEF DESCRIPTION OF THE DRAWINGS

The drawings illustrate some embodiments, and along with the specification, will be used to describe these embodiments. The accompanying drawings only illustrate some embodiments, thus are not an exhaustive depiction, of this specification. Therefore, this specification is not limited herein by the drawings presented, and other drawings of the embodiments can be derived from the drawings presented herein by one of ordinary skill in the art without creative efforts.

DETAILED DESCRIPTION OF THE EMBODIMENTS

Figure 1:
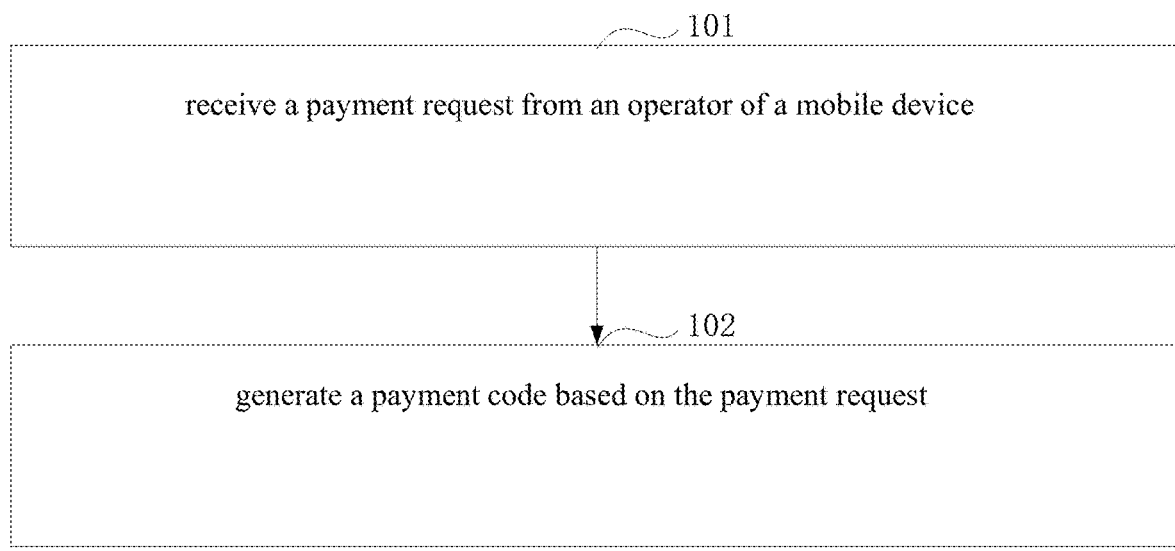
FIG. 1 shows a flowchart illustrating a scan-to-pay method for a mobile device in accordance with some embodiments.

Biometric techniques are gradually finding their ways into payment applications. Each individual possesses measurable or verifiable physiological characteristics or behavioral characteristics, collectively known as biological characteristics, that are unique to himself/herself. Biological characteristics of a person may include physiological biometric signatures and behavioral biometric signatures (BBS). The physiological biometric signatures may include a person's eye characteristics (including eye features, iris characteristics, sclera characteristics, etc.), voiceprint, fingerprint, palm print, heartbeat pattern, heart pulse pattern, chromosome, DNA sequences, bite mark, etc. The behavioral biometric signatures may include a person's walking posture, sound, handwriting, keystroke pattern, key-pressing force, gesture to hold an electronic device, as well as a person's online browse log and Remote Procedure Call (RPC) protocol requesting record, etc. Biometric techniques rely on a person's unique physiological characteristics to verify his/her identity.

Identity verification by biological characteristics is safe, reliable, and accurate, therefore payment security applications are increasingly relying on biometrics techniques for identify verification. However, detail implementations of biometric techniques in payment applications to achieve efficient risk control remain to be fully exploited.

This application presents a scan-to-pay method for a mobile device and related devices. According to some embodiments, the method comprises: receiving a payment request from an operator of the mobile device and generating a payment code based on the payment request, with the payment code comprising first information associated with a payment account and second information associated with at least one recent behavioral biometric signature of the operator and at least one historical behavioral biometric signature recorded in the mobile device.

In this method, information related to the recent behavioral biometric signatures of the operator and the historical behavioral biometric signatures recorded in the mobile device is encoded in the payment code and transmitted to a server for risk assessment. Compared to conventional risk control processes, the risk control system of this application evaluates the risk based on more comprehensive data, and therefore provides more accurate results.

The behavioral biometric signatures used in the embodiments include at least one of a person's RPC request record, browse log, gesture to hold a mobile device, and finger pressing characteristics.

To allow one of ordinary skill in the art to better understand the technical aspects of this application, the embodiments will be clearly and thoroughly described along with the accompanying drawings. It is obvious that the embodiments presented herein are some, but not all, of the embodiments of this application, and the scope of this application is not intended to be limited by these embodiments. Based on the embodiments disclosed herein, other embodiments may be derived by one of ordinary skill in the art without creative effort, and these embodiments shall fall within the scope of this application as well.

FIG. 1 shows a flowchart illustrating a scan-to-pay method for a mobile device in accordance with some embodiments. This scan-to-pay method is described below with reference to FIG. 1.

In step 101, a payment request from an operator of a mobile device is received.

More specifically, the operator of the mobile device may send a payment request through a payment widget or a payment webpage link on a website. The payment request may be sent to a client of the mobile device.

At the time the payment request is received, the mobile device may already possess some behavioral biometric signatures of the operator of the mobile device before he/she makes the payment request. In some embodiments, these behavioral biometric signatures may be collected by a system or device installed on the mobile device that is capable of identifying behavioral biometric signatures of the operator. These signatures may be obtained by other manners, thus this application is not limited herein.

For ease of the description, in this application, it is assumed that the behavioral biometric signatures are collected by a system or device installed on the mobile device that is capable of identifying behavioral biometric signatures of the operator.

In some embodiment, behavioral biometric signatures depict, to a degree, behavioral habits of the operator. A person's behavioral biometric signatures largely remain consistent over time, therefore an operator's behavioral biometric signatures in operating a mobile device, which can be collected by a system or device install on the mobile device, can be used to verify the identity of the operator.

For example, online contents a user browsed over a period of time typically reflect the user's personal or professional preferences, which are unlikely to change abruptly. Therefore if a system or device monitoring behavioral biometric signatures of the user of a mobile device detects a substantial change on the online contents browsed by the operator in a short period of time (i.e., distinct browse log activities), it can be inferred that the user of the mobile device may have changed, i.e., the user currently using the mobile device may not be the user who had registered his/her behavioral biometric signatures.

In some embodiments, a behavioral biometric signature monitoring system or device may be used to collect behavioral biometric signatures of an operator of a mobile device, and a client-side risk control system on the mobile device may determine whether the operator is the registered owner of the mobile device based on behavioral biometric signatures collected. In case a "no-match" is found, the client-side risk control system may provide conflicting signatures to the server-side risk control system to facilitate further risk control processes. The conflicting signatures depict the differences between the behavioral biometric signatures collected and the behavioral biometric signatures in the records, which provide a comprehensive assessment on the identity of the operator.

Before initiating a payment request, the operator of the mobile device may conduct other operations on the mobile device, such as browsing web pages, swiping on the screen, etc. All these operations may be referred to as behavioral biometric signatures of the operator, and may be collected by the behavioral biometric signature monitoring system or device on the mobile device.

The behavioral biometric signatures collected by the behavioral biometric signature monitoring system or device may be stored in a designated storage space. A library of behavioral biometric signatures may be maintained in a designated storage space to store the behavioral biometric signatures of the operators collected at different times. Normally, behavioral biometric signatures stored in the designated storage space of a device may be mostly those of the owner of the mobile device. Additionally, depending on the size of the designated storage space, the designated storage space may store only the behavioral biometric signatures within a certain period of time. For example, it may only store the behavioral biometric signatures that are collected recently ("recently" here may mean a set period of time (e.g., a week) before the payment request is made). These behavioral biometric signatures may be referred to as "recent behavioral biometric signatures." Behavioral biometric signatures collected on other times (i.e., those collected before the past week) may be referred to as "historical behavioral biometric signatures" and may be disposed by other means. For example, they may be stored on the mobile device, sent to a server, or stored in a hard disk drive.

When storing the behavioral biometric signatures, a mapping relationship between a collection time and the collected behavioral biometric signatures will also be stored in the library of behavioral biometric signatures described above.

In step 102: a payment code is generated based on the payment request.

In some embodiments, the payment code may comprise first information and second information, with the first information associated with a payment account and the second information associated with at least one recent behavioral biometric signature of the operator and at least one historical behavioral biometric signature recorded in the mobile device.

In some embodiments, the payment code may be generated by a client in the mobile device immediately upon receiving the payment request.

More specifically, in one example, upon receiving the payment request, the first information associated with a payment account and the second information associated with at least one recent behavioral biometric signature of the operator and at least one historical behavioral biometric signature recorded in the mobile device will first be identified.

The first information may include information associated with a payment account, such as an account identifier, an account name, an account number, a payment account identifier, or a mobile device identifier, etc.

The second information will be described in details below. The second information in some embodiments may be associated with at least one recent behavioral biometric signature of the operator and at least one historical behavioral biometric signature recorded in the mobile device. Before the second information is identified, a time period will first be determined to define a time window under which the behavioral biometric signatures stored in the mobile device will be included in the second information.

In some embodiments, the time period may be determined by a client based on the time the payment request is received. Based on the time period selected, the client may identify behavioral biometric signatures in the designated storage space of the mobile device that are collected during the selected time period. These behavioral biometric signatures may be referred to as "recent behavioral biometric signatures" of the operator. For example, behavioral biometric signatures collected within a time period before the payment request is received may be used as recent behavioral biometrics signatures. Behavioral biometric signatures collected before that time period may be used as historical behavioral biometric signatures.

The second information may be determined after at least one recent behavioral biometric signature are obtained. In some embodiments, the second information may also include conflicting signatures obtained from a risk identification module in the client. Subsequently, after the server receives a payment code comprising the first information and the second information, some risk identification processes may be done based on the second information alone, which substantially reduces the networking and computing resource needed on the server and improves the efficiency of the risk identification process.

In some embodiments, the second information may be obtained in several manners described below:

First Manner:

After at least one behavioral biometric signature of the operator before the payment request are obtained, a comparison between the recent behavioral biometric signature of the operator and historical behavioral biometric signature recorded in the mobile device may be conducted to determine whether the operator is the owner of the mobile device.

More specifically, a similarity between the recent behavioral biometric signature of the operator and historical behavioral biometric signature recorded in the mobile device may be calculated, and a determination that whether the operator is the owner of the mobile device may be made according to the calculated similarity.

A similarity greater than a set threshold indicates that the operator is the owner of the mobile device, while a similarity less than the set threshold indicates otherwise.

The second information may be obtained based on the determination that whether the operator is the owner of the mobile device. That is, the second information may comprise a determination result that whether the operator is the owner of the mobile device, wherein the determination result may be that the operator is the owner of the mobile device or the operator is not the owner of the mobile device.

Second Manner:

In some embodiments, the second information may also include a combination of different information. That is, in addition to a determination result of whether the operator is the owner of the mobile device, the second information may further include a determination result of whether some or all of the recent behavioral biometric signatures are distinct in comparison with the corresponding historical behavioral signatures in the records. By including a combination of different comparison results, the second information can provide a more accurate determination on the identity of the operator.

For example, in addition to the determination that whether the operator is the owner of the mobile device, the second information may further comprise a determination result that whether some or all of collected behavioral biometric signatures are distinct compared to corresponding historical behavioral biometric signatures, such as a determination result that whether the RPC request records are distinct from those in the records, or a determination result that whether the browse logs are distinct from those in the records, etc.

A binary value (true or false) may be used to represent the determination result that whether the operator is the owner of the mobile device, In this case, the mobile device may need to perform substantial computation to obtain an accurate result, which leads to large computational burdens for the mobile device. By including a combination of different comparison results when making the determination, the determination result may be expressed as a probability in a numerical value. When accompanying with other comparison results, identity verification for the owner of the mobile device can be performed more accurately and efficiently.

For example, if the second information is obtained through the first manner described above, a probability that the operator being the owner of the mobile device is lower than a set threshold will result in a determination that the operator is not the owner of the mobile device. By including additional comparisons, the determination result may be adjusted, and the subsequent operations on the server may also be affected accordingly.

If the second information is obtained through the second manner described above, when the server receives the payment code, the determination of the operator identity is not made based on one single comparison, as in the case of the first manner, instead the determination is made through mutual corroboration among various comparison results, and that improves the efficiency and accuracy of the risk control process.

If the determination of the operator identity based on the first manner does not produce a conclusive result (i.e., cannot determine whether the operator is the owner of the mobile device), the second information may be obtained by the second manner when the payment code is generated, thus the second information may include additional information to produce a more accurate determination of the operator identity.

After the first information and the second information are determined, a payment code is generated based on the first information and the second information.

In one example, the payment code may be generated by encoding the first information and the second information.

For the first manner described above, since the second information comprises a binary determination result, it can be assumed that an identifier value of 1 corresponds to a determination result that the operator is the owner of the mobile device, and an identifier value of 0 corresponds to a determination result that the operator is not the owner of the mobile device. Hence the payment code can be obtained by using the identifier value to encode the second information.

When the server receives the payment code, it can complete operator identification based on the second information in the payment code. That is, if the identifier value in the payment code is 0, the server determines that the operator is not the owner of the mobile device; if the identifier value in the payment code is 1, the server determines that the operator is the owner of the mobile device. As a result, the server can complete risk control for the payment request without substantial computation.

For the second manner describe above, since the second information comprises a combination of different comparison results, the second information needs to go through a more complicate conversion process to obtain the identifier value corresponding to the second information.

The conversion process of the second information will be described below using an example wherein the second information comprises three comparison results: a determination result whether the operator is the owner of the mobile device, a determination result whether the RPC request records are distinct from those in the records, and a determination result whether the browse logs are distinct from those in the records.

Assuming in this example, these three comparison results can be represented by a three-digit binary number: [X][Y][Z], with X corresponding to the determination result whether the operator is the owner of the mobile device, i.e., the value of X is x1 if the determination result is that the operator is the owner of the mobile device, otherwise, the value of X is x2;

Y corresponds to the determination result that whether the browse logs are distinct, i.e., the value of Y is y1 if the determination result is the browse logs are not distinct, otherwise, the value of Y is y2; and Z corresponds to the determination result that whether the RPC request records are distinct, i.e., the value of Z is z1 if the determination result is that the RPC request records are not distinct, otherwise, the value of Z is z2.

Based on the determination results on different information, the mobile device can obtain a binary code, which may be referred to as an identifier value corresponding to the second information. The binary code may further be converted to a decimal number, and in that case, the decimal number is an identifier value corresponding to the second information.

To ensure the uniqueness and security of the payment code, the identifier value corresponding to the second information may be determined in a random manner. For example, a number randomly selected from 10 numbers of 0 to 9 may be used to represent each of x1, x2, y1, y2, z1, and z2 based on a mapping relationship between this number and [X][Y][Z].

In one example, during the number selection, 1 to 2 numbers may be randomly selected from the 10 numbers of 0 to 9 as redundant numbers, redundant numbers increase the encoding noise for increased security. The redundant numbers, however, cannot be a number that have been used to represent X, Y, or Z.

[X][Y][Z] is typically a three-digit binary number, and thus has a value range from 0 to 7 (in decimal format). The information represented by [X][Y][Z] may have a total of eight possible combinations, thus eight numbers may be selected from the 10 numbers of 0 to 9, with each representing one of eight possible combinations.

For example, in the encoding method described above, a combination of the determination results that "the operator is the owner, the RPC records are not distinct, and the browse logs are not distinct" may be represented by a binary number of [1][0][0], which has a decimal number of 4. Correspondingly, if the number for storing the behavioral biometric signatures after decoding is 4, it represents a combination of the determination results that "the operator is the owner, the RPC records are not distinct, and the browse logs are not distinct."

Number selections for the encoding may be fully customizable. For example, in the embodiments described above, number 4 represents a combination of the determination results that "the operator is the owner, the RPC records are not distinct, and the browse logs are not distinct." Any other number from 0 to 9 may replace number 4 to represent the same results. In other words, as long as a mapping relationship between the possible combinations of the three determinations described above and different numerical values is established, the exact number that can be used to present a particular determination result is customizable. In addition, redundant numbers used for encoding noise may also be customizable. By changing the numbers in the encoding and the numbers for redundant numbers regularly or irregularly, encoding security can be improved. One of ordinary skill in the art would understand that the behavioral biometric signatures listed in the embodiments described above are merely preferred examples, and are not exhaustive. Any behavioral biometric signature that can be collected on a mobile device may be used to determine whether the operator is the owner of the mobile device. Some embodiments that are not fully described herein may further comprise determining whether to activate a server-side risk control process based on information related to the behavioral biometric signatures.

To ensure the uniqueness of security of the payment code, the mapping relationship between the identifier and the second information may be at least partially changed regularly or periodically. Alternatively, before the payment code is generated based on the payment request, the mapping relationship between the identifier and the second information may be changed by changing at least one of the redundant numbers for enhanced security.

In some embodiments, the method may further comprise: if the determination result is that the probability that the operator is the owner of the mobile device is lower than a set threshold and it is determined that the mobile device is in an offline payment state, activating an online identity verification process against the operator of the mobile device.

In one example, when determining whether the operator is the owner of the mobile device, the determination result may be represented by a probability, a probability lower than a set threshold indicates a high likelihood that the operator is not the owner of the mobile device. If the mobile device is in an offline payment state at this moment, an online identity verification process may be activated to further verify the identity the operator of the mobile device. That is, the operator of the mobile device is required to initiate an online payment request and go through an online identity verification process.

The scan-to-pay method in accordance with some embodiments may refer to, for example, a process of generating a payment code on the mobile device, and a merchant reading information in the payment code using a scanning device, and sending the information to a server to complete the payment.

According to the embodiments described above, a payment code may be generated on the mobile device for a merchant to scan to complete the payment. In the payment method according to this specification, determination results based on the behavioral biometric signatures are encoded into the payment code, which essentially provides an auxiliary offline risk control assistance. This auxiliary offline risk control assistance substantially reduces the burden on the server to conduct the risk control process, and thus reduces the resources consumption and processing time of the risk control process.

In the scan-to-pay method of this application, upon receiving a payment request from an operator of a mobile device, a payment code is generated based on the payment request. The payment code comprises first information associated with a payment account, and second information associated with at least one recent behavioral biometric signature of the operator and at least one historical behavioral biometric signature recorded in the mobile device. In this method, a determination result based on the behavioral biometric information of the operator is encoded into the payment code and transmitted to the server for risk control process. Thus, compared to conventional risk control processes, the risk control system of this application evaluates the risk based on more comprehensive data, and therefore provides more accurate results. As a result, the overall efficiency of the risk control processes can be substantially improved.

In the scan-to-pay method in accordance with some embodiments, user identity verification is conducted on a client based on the behavioral biometric signatures. That not only ensures the security of offline payment, but also reduces the cost to conduct risk control on the server. Thus the efficiency of offline payment risk control process may be improved.

Figure 2:
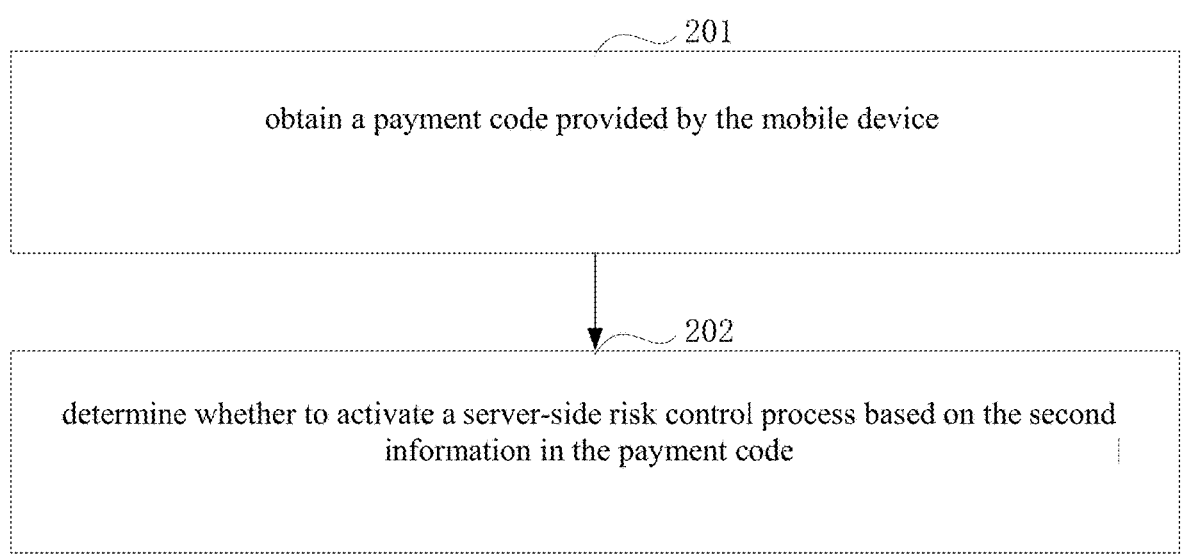
FIG. 2 shows a flowchart illustrating a risk control method for scan-to-pay on a mobile device in accordance with some embodiments.

FIG. 2 shows a flowchart illustrating a risk control method for scan-to-pay on a mobile device in accordance with some embodiments. This method can be performed on a scanner or a server. If it is performed on a server, the server may be different from the one performing risk identification described above. The risk control method of FIG. 2 is described below.

In step 201, a payment code provided by a mobile device is received.

In this embodiment, the payment code may comprise: first information associated with a payment account and second information associated with at least one recent behavioral biometric signature of an operator of the mobile device and at least one historical behavioral biometric signature recorded in the mobile device.

In some embodiments, the payment code provided by the mobile device may be obtained by using a scanning gun to scan the payment code, or using a payment code identification device to receive a payment code. The methods that can be used to obtain the payment code are not limited herein.

For example, a two-dimensional (2D) barcode image provided by the mobile device may be scanned; and, from the 2D barcode image, the first information associated with a payment account and second information associated with the at least one recent behavioral biometric signature of the operator of the mobile device and the at least one historical behavioral biometric signature recorded in the mobile device may be extracted.

That is, the information in the payment code provided by the mobile device may be extracted by scanning the payment code.

In step 202, a determination result of whether to activate a server-side risk control process is made based on the second information in the payment code.

In some embodiments, the second information in the payment code may be obtained by conducting a decoding operation on the payment code.

If the second information includes only a determination result that whether the operator is the owner of the mobile device, then a risk control request will be sent to the server if the determination result is that the operator is not the owner of the mobile device; if the determination result is that the operator is the owner of the mobile device, then the payment request will be fulfilled.

If the second information comprises a combination of determination results from different comparisons, then the probability that the operator is the owner of the mobile device is determined through the combination of different determination results.

For example, a probability that the operator is the owner of the mobile device may be determined through a combination of the following determination results: a determination result of whether the operator is the owner of the mobile device based on the methods described above, a determination result that whether the browse logs are distinct from those in the records, and a determination result that whether the RPC request records are distinct from those in the records. In this case, if the determination result (expressed as a probability value) that the operator is the owner of the mobile device is lower than a set threshold, it can be determined that the probability that the operator is the owner of the mobile device is lower than a second threshold when at least one of the browse logs and the RPC request records is determined to be distinct, and it can be determined that the probability that the operator is the owner of the mobile device is less than a second threshold but higher than a first threshold when both the browse logs and the RPC request records are determined to be not distinct.

If the determination result (expressed as a probability value) that the operator is the owner of the mobile device is higher than the set threshold, it can be determined that the probability that the operator is the owner of the mobile device is not higher than the first threshold and higher than the second threshold if at least one of the browse logs and the RPC request records is determined to be distinct. If both the browse logs and the RPC request records are determined to be not distinct, it can be determined that the probability that the operator is the owner of the mobile device is higher than the first threshold.

The following operations may be executed based on the determination results:

if the probability is higher than the first threshold, the payment request may be fulfilled;

if the probability is lower than the second threshold, indicating that the operator is not the owner of the mobile device, a risk identification request will be sent to a risk control system on the server to activate a server-side risk control process;

if the probability is not higher than the first threshold and higher than the second threshold, indicating that there is a risk that the operator may not be the owner of the mobile device, an identity verification request, which requires the operator to provide offline identity verifications (e.g., presenting an I.D., providing information proving that the operator is the owner of the mobile device, etc.) to the user of the scanning device, may be sent to a scanning device to ensure the security of the transaction. Alternatively, an online transaction request may be sent to the scanning device, requesting the user using the scanning device to notify the operator to activate an online payment process, so that the identity of the operator can be verified online.

In some embodiments, when the payment code provided by the mobile device is received, whether a further server-side risk control process is necessary may be determined based on a determination result of a risk control process based on the behavioral biometric signatures of the operator in the payment code. Experimental results demonstrate that, by using a local risk identification system on a local terminal to complete the risk control, a 70% reduction on the computation cost of the terminal device can be achieved, which indicates a substantially reduction to the cost associated with server-side risk control process and an improvement on the efficiency of the server-side risk control process.

Figure 3:
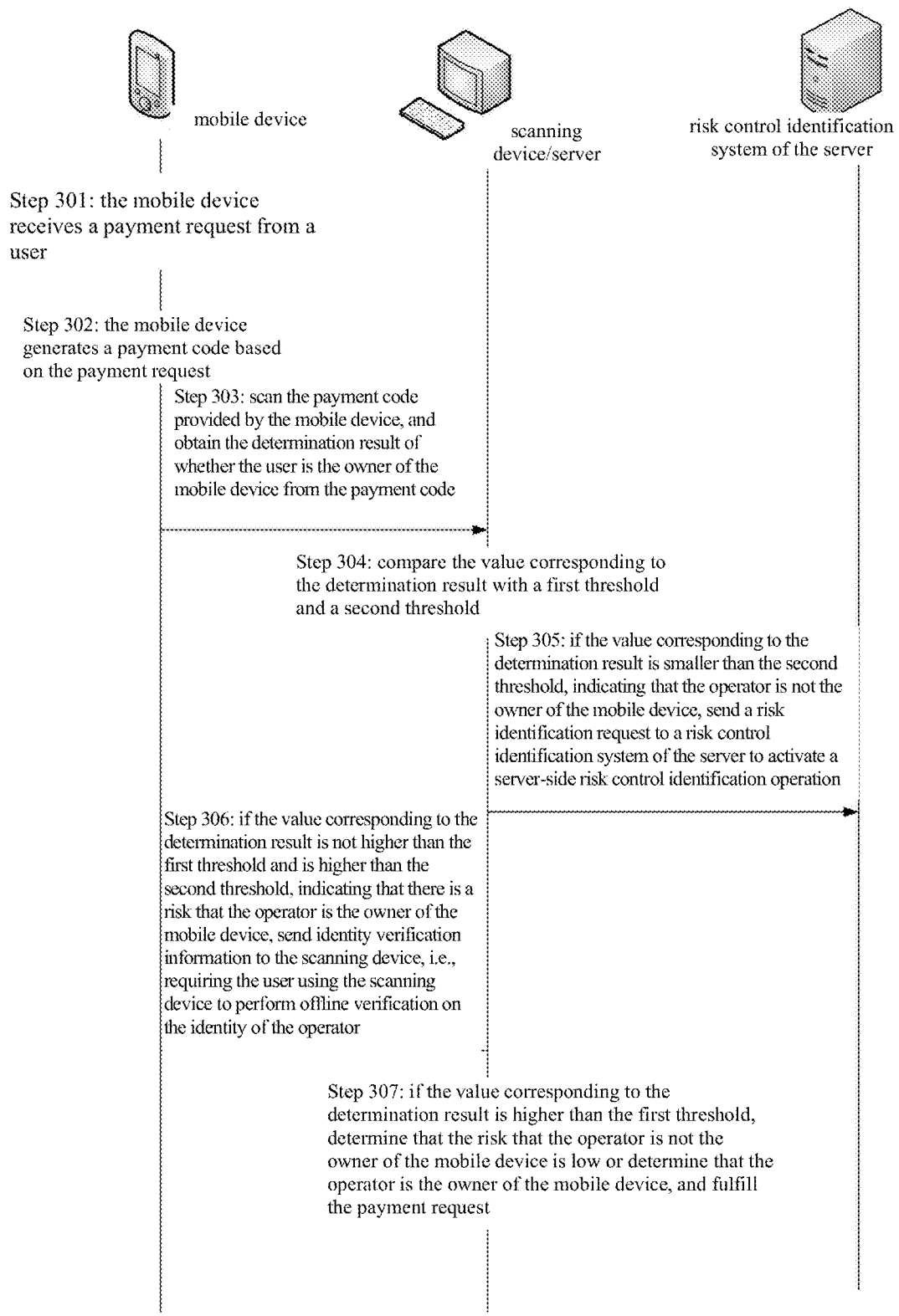
FIG. 3 shows a flowchart illustrating a risk control method for scan-to-pay on a mobile device in accordance with some embodiments.

FIG. 3 shows a flowchart illustrating a risk control method for scan-to-pay on a mobile device in accordance with some embodiments. These embodiments will be described in details.

In step 301, a payment request from a user is received by a mobile device.

The payment request may be sent to a mobile device when the user of the mobile device is in an offline state.

When the mobile device receives the payment request, it identifies the behavioral biometric signatures of the user collected within a certain period of time, these behavioral biometric signatures are referred to as "recent behavioral biometric signatures" in succeeding discussions.

In step 302, a payment code is generated by the mobile device based on the payment request.

The payment code may comprise information about a payment account of the user, at least one recent behavioral biometric signature of the user, at least one historical behavioral biometric signature recorded in the mobile device, and a determination that whether the user is the owner of the mobile device.

In step 303, the payment code provided by the mobile device is scanned, and the determination that whether the user is the owner of the mobile device is made based on the payment code, with the determination result being represented in a percentage form.

In step 304, the determination result is compared with a first threshold and a second threshold.

The first threshold may be different from the second threshold in some embodiments, with the second threshold smaller than the first threshold.

In step 305, if the determination result (expressed as a probability value) is smaller than the second threshold, indicating the operator is not the owner of the mobile device, a risk identification request will be sent to a risk control identification system on the server to activate a server-side risk control identification process.

In step 306, if the determination result is not higher than the first threshold and higher than the second threshold, indicating there is a risk that the operator is not the owner of the mobile device, an identity verification request will be sent to the scanning device, requesting the user of the scanning device to perform offline identity verification on the operator.

In step 307: if the determination result is higher than the first threshold, indicating that the operator is the owner of the mobile device (or at least the risk of otherwise is low), the payment request will be fulfilled.

In the embodiments in accordance with this specification, the information associated with a user's behavioral biometric signatures is encoded offline into the payment code and a decision of whether to activate a server-side risk control process is made based on the information. Thus the cost associated with server-side risk control can be substantially reduced, which increases the speed for overall risk control and improves user experience.

Figure 4:
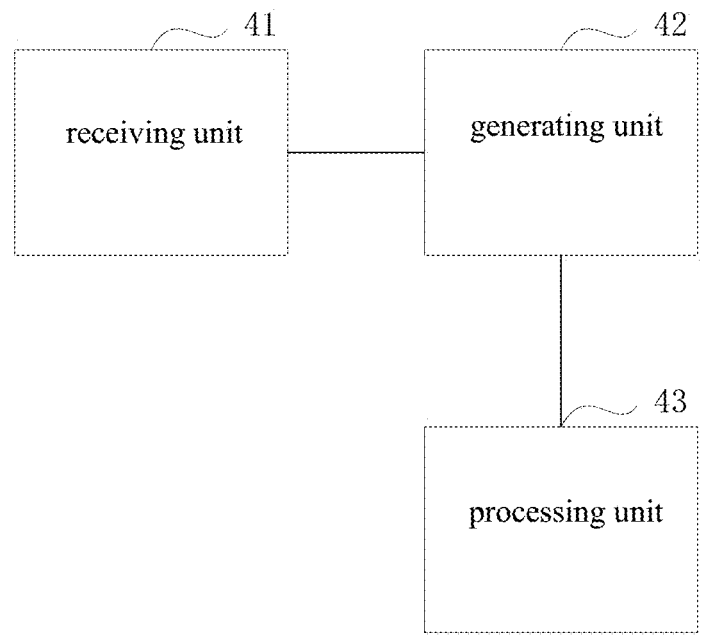
FIG. 4 shows a schematic diagram illustrating a scan-to-pay device for a mobile device in accordance with some embodiments.

FIG. 4 shows a schematic diagram illustrating a scan-to-pay device for a mobile device in accordance with some embodiments of this application. The device comprises: a receiving unit 41 and a generating unit 42, wherein the receiving unit 41 is for receiving a payment request of an operator of the mobile device, and the generating unit 42 is for generating a payment code based on the payment request. The payment code comprises: first information associated with a payment account and second information associated with at least one recent behavioral biometric signature of the operator and at least one historical behavioral biometric signature recorded in the mobile device.

In some embodiments, the second information may further comprise: a determination result of whether the operator is the owner of the mobile device based on a comparison of at least on recent behavioral biometric signature of the operator and at least one historical behavioral biometric signature recorded in the mobile device.

In some embodiments, the device may further comprise: a processing unit 43, wherein the processing unit 43 activates an online identity verification process to the operator of the mobile device, if the determination result is that the probability that the operator is the owner of the mobile device is lower than a set threshold and it is determined that the mobile device is in an offline payment state.

In some embodiments, the generating unit 42 generating a payment code based on the payment request may comprise: determining the first information associated with the payment account and the second information associated with the at least one recent behavioral biometric signature of the operator and the at least one historical behavioral biometric signature recorded in the mobile device based on the payment request; determining an identifier value corresponding to the second information according to a mapping relationship between the second information and the identifier value; and generating a payment code based on the identifier value and the first information, with at least one digit of the payment code corresponding to the identifier value.

In some embodiments, the behavioral biometric signatures may comprise at least one of a user's RPC request record, browse log, gesture to hold a mobile device, and finger pressing characteristics.

The device in some embodiments of the specification may be implemented through either a software or a hardware, and this specification is not limited herein. The device receives a payment request of an operator of the mobile device; and generates a payment code based on the payment request, with the payment code comprising first information associated with a payment account and second information associated with at least one recent behavioral biometric signature of the operator and at least one historical behavioral biometric signature recorded in the mobile device. In this specification, an identification result based on the behavioral biometric information of the operator is encoded into the payment code and transmitted to the server to determine whether any further risk control process is necessary. Thus, compared to conventional risk control processes, the risk control system of this application evaluates the risk based on more comprehensive data, provides more accurate results, and overall is a more efficiency process.

Figure 5:
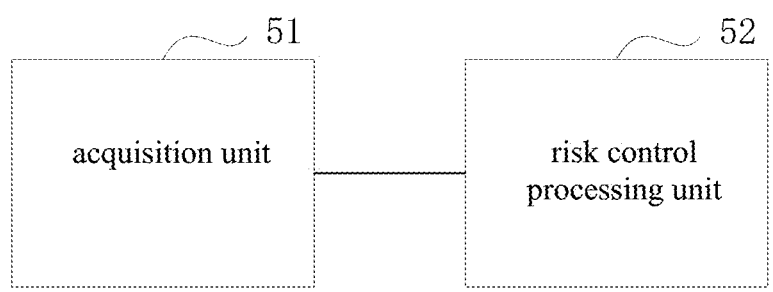
FIG. 5 shows a schematic diagram illustrating a risk control device for scan-to-pay on a mobile device in accordance with some embodiments.

FIG. 5 shows a schematic diagram illustrating a risk control device for scan-to-pay on a mobile device in accordance with some embodiments of this application. The risk control device comprises an acquisition unit 51 and a risk control processing unit 52, with the acquisition unit 51 obtaining a payment code from the mobile device. The payment code comprises first information associated with a payment account and second information associated with at least one recent behavioral biometric signature of an operator of the mobile device and at least one historical behavioral biometric signature recorded in the mobile device. The risk control processing unit 52 is for determining whether to activate a server-side risk control identification based on the second information in the payment code.

In some embodiments, the acquisition unit 51 may obtain the payment code provided by the mobile device through the follow steps: first, the acquisition unit 51 scans a 2D barcode image provided by the mobile device, and second, the acquisition unit 51 extracts from the 2D barcode image the first information associated with a payment account and the second information associated with the at least one recent behavioral biometric signature of the operator of the mobile device and the at least one historical behavioral biometric signature recorded in the mobile device.

In some embodiments, the second information may comprise a determination result of whether the operator is the owner of the mobile device based on a comparison of at least one recent behavioral biometric signature of the operator and at least one historical behavioral biometric signature recorded in the mobile device. The risk control processing unit 52 may determine whether to activate a server-side risk control identification by evaluating the determination result in the payment code. That is, if the determination result in the payment code is that the operator is not the owner of the mobile device, the risk control processing unit 52 activates the server-side risk control identification.

In some embodiments, the second information may comprise a determination result of whether the operator is the owner of the mobile device, a determination result of whether the browse log is distinct, and a determination result of whether the Remote Procedure Call Protocol is distinct based on a comparison of recent behavioral biometric signatures of the operator and historical behavioral biometric signatures recorded in the mobile device.

The risk control processing unit 52 may determine whether to activate a server-side risk control identification by evaluating the determination result. That is, if the determination result in the payment code is that the probability that the operator is the owner of the mobile device is lower than a set threshold, the server-side risk control identification will be activated when at least one of the browse log and the RPC request records is determined to be distinct.

The risk control device in some embodiments may be implemented through either a software or a hardware, and this specification is not limited herein. When the risk control device receives the payment code provided by the mobile device, the risk control device may determine whether a server-side risk control operation is necessary based on a result of risk control identification performed by the terminal device based on behavioral biometric signatures of the operator in the payment code. Experimental results show that, by using a local risk identification system on a local terminal to complete the risk control, a 70% reduction on the computation cost of the terminal device can be achieved, which indicates a substantially reduction to the cost associated with server-side risk control process and an improvement on the efficiency of the server-side risk control process.

In the 1990s, an improvement to a technology can be easily differentiated into a hardware improvement (e.g., an improvement to a circuit structure, such as a diode, a transistor, a switch, etc.) or a software improvement (an improvement to a flow of a method). With the advancements in technologies, however, many improvements to method flows (which traditionally are deemed software improvements) nowadays may be deemed as improvements to hardware circuit structures as well. Designers frequently obtain a corresponding hardware circuit structure by programming an improved method flow into a hardware circuit. Therefore, it cannot be asserted that an improvement to a method flow cannot be realized with a hardware module. For example, Programmable Logic Device (PLD) (e.g., Field Programmable Gate Array (FPGA)) is an integrated circuit whose logic functions are determined by a user through programming the device. A digital system may be "integrated" onto one piece of PLD by a designer, without resorting to a chip manufacturer to design and manufacture a dedicated IC chip. Currently, instead of manually manufacturing the IC chips, this type of programming has mostly been implemented through "logic compiler" software. The logic compiler software is similar to a software compiler used for program development, and a particular programming language, known as Hardware Description Language (HDL), must be used for writing source codes prior to compiling. HDL may further comprise several different languages, including Advanced Boolean Expression Language (ABEL), Altera Hardware Description Language (AHDL), Confluence, Cornell University Programming Language (CUPL), HDCal, Java Hardware Description Language (JHDL), Lava, Lola, MyHDL, PALASM, Ruby Hardware Description Language (RHDL), etc., and Very-High-Speed Integrated Circuit Hardware Description Language (VHDL) and Verilog are among those that are most frequently used. One of ordinary skill in the art would understand that a hardware circuit corresponding to the methods of this specification is easily obtainable by using one of the Hardware Description Languages (HDL) described above to program the methods into an Integrated Circuit (IC).

A controller may be implemented by any proper method. For example, a controller may have a form of a microprocessor (or a processor), a machine-readable medium storing machine-readable programs (e.g., software or firmware) that can be executed by the microprocessor (or processor), logic gates, switches, Application Specific Integrated Circuit (ASIC), programmable logic controllers, and embedded microcontrollers. Examples of the controller may include, but not limited to: ARC 625D, Atmel AT91SAM, Microchip PIC18F26K20, and Silicone Labs C8051F320. A memory controller may further be implemented as a part of a control logic of a memory. One of ordinary skill in the art would understand that, in addition to using machine-readable programs to implement a controller, the controller may also be implemented by logic gates, switches, ASIC, programmable logic controllers, and embedded microcontrollers by logic programming. Therefore, such a controller can be deemed a hardware, and the internal components of the controller that are configured to achieve various functionalities may also be deemed as an internal structure of the hardware. Alternatively, devices configured to achieve various functionalities may be deemed as both software modules to implement a method and an internal structure of a hardware.

The systems, devices, modules or units described in the embodiments may be implemented by a computer chip, a hardware component, or a functional product. A typical implementation device is a computer. In one example, the computer may be a personal computer, a laptop computer, a cellular phone, a camera phone, a smart phone, a personal digital assistant, a medium player, a navigation device, an email device, a game console, a tablet computer, a wearable device, or a combination of any of these devices.

For the convenience of description, the devices of this specification are described in term of several functional components. It is obvious that the functionalities of these components may be integrated into one or more software and/or hardware components.

One of ordinary skill in the art would understand that the embodiments of this specification may be provided as a method, a system, or a computer program product. Accordingly, this specification may be implemented as a pure hardware embodiment, a pure software embodiment, or an embodiment with a combination of software and hardware embodiments. Additionally, this specification may be implemented in the form of a computer program product implemented on one or more of machine-readable storage media (including, but not limited to, a Hard Disk Drive, a CD-ROM, an optical storage medium, etc.) comprising machine-readable programs.

This specification is described with reference to flowcharts and/or block diagrams of the methods, devices (systems), and computer programs in accordance with the embodiments. Different processes and/or blocks in the flowcharts and/or block diagrams may be combined by computer program instructions. These computer program instructions may be sent to a general-purpose computer, a special-purpose computer, an embedded processor, or a processor of programmable data processing devices to generate machinery, so that a device with the functionalities corresponding to one or more processes and/or blocks in the flowcharts and/or block can be implemented by a computer or other programmable data processing device executing the computer program instructions.

These computer program instructions may also be stored in a machine-readable memory that can instruct a computer or other programmable data processing devices to work in a particular manner, so that a manufactured article that includes an instruction device may be generated by the instructions stored in the machine-readable memory. The instruction device may implement a function specified in one or more processes in the flowcharts and/or in one or more blocks in the block diagrams.

These computer program instructions may also be loaded onto a computer or other programmable data processing devices, so that a series of operations can be performed on the computer or other programmable devices to generate a computer-implemented processing. Therefore, the instructions executed by the computer or other programmable devices may implement a function specified in one or more processes in the flowcharts and/or in one or more blocks in the block diagrams.

In a typical configuration, the computation device may include one or more processors (CPUs), input/output interfaces, network interfaces, and a memory.

The memory may include machine-readable media, such as a volatile memory, a Random Access Memory (RAM), and/or a non-volatile memory, e.g., a Read-Only Memory (ROM) or a flash RAM. The memory is an example of a machine-readable medium.

Machine-readable media may include permanent, volatile, mobile, and immobile media, and information storage can be implemented through any known method or technology. The information may be machine-readable instructions, data structures, program modules, or other data. Examples of storage media of computers include, but not limited to, Phase-change Random Access Memories (PRAMs), Static Random Access Memories (SRAMs), Dynamic Random Access Memories (DRAMs), other types of Random Access Memories (RAMs), Read-Only Memories (ROMs), Electrically Erasable Programmable Read-Only Memories (EEPROMs), flash memories or other memory technologies, Compact Disk Read-Only Memories (CD-ROMs), Digital Versatile Discs (DVDs) or other optical memories, cassettes, cassette and disk memories or other magnetic memory devices, or any other non-transmission media, which can be used for storing information accessible to a computation device. According to the definitions in the specification, the machine-readable media do not include transitory media, such as modulated data signals and carriers.

The terms of "including," "comprising," or any other variants of the terms are intended to encompass a non-exclusive inclusion, causing a process, method, commodity, or device comprising a series of elements to not only comprise these elements, but also comprise other elements that are not clearly listed, or further comprise elements that are inherent to the process, method, commodity, or device. When there is no further restriction, elements defined by the statement "comprising one . . . " does not exclude that a process, method, commodity, or device comprising the above elements further comprises additional identical elements.

One of ordinary skill in the art would understand that the embodiments of this specification may be provided as a method, a system, or a computer program product. Therefore, the embodiments may be implemented as a complete hardware embodiment, a complete software embodiment, or an embodiment combing software and hardware. Moreover, the present application may be in the form of a computer program product implemented on one or more computer usable storage media (including, but not limited to, a magnetic disk memory, CD-ROM, an optical memory, etc.) comprising computer usable program codes.

This specification may be described in a regular context of a computer executable instruction that is executed by a computer, such as a program module. Generally, the program module comprises a routine, a program, an object, a component, a data structure, etc. for executing a particular task or implementing a particular abstract data type. This specification may also be practiced in distributed computing environments. In these distributed computing environments, remote processing devices connected via communication networks carry out tasks. In the distributed computing environments, a program module may be located in local and remote computer storage media, including storage devices.

The embodiments of this specification are described in a progressive manner with each embodiment focused on differences from other embodiments, and the embodiments may be mutually referenced for identical or similar parts. In particular, the system embodiment is described in a relatively simple manner, as the system embodiment is substantially similar to the method embodiment. The description of the method embodiment may be referenced for the related parts.

The embodiments disclosed herein are not used to limit the present application. To one of ordinary skill in the art, this specification may have various modifications and changes. Any modification, equivalent substitution, or improvement made within the spirit and principle of the present application shall be encompassed by the claims of the present application.

What is claimed is:

1. A scan-to-pay method for a mobile device, comprising:
collecting, by the mobile device, at least one historical behavioral biometric signature;
storing, on the mobile device, the at least one historical behavioral biometric signature;
receiving, by the mobile device, a payment request from an operator of the mobile device; and
generating, by the mobile device, a payment code based on the payment request, wherein the payment code comprises a redundant number, wherein the generating a payment code based on the payment request comprises:
changing a value of the redundant number;
determining, based on the payment request, first information and second information, the first information being associated with a payment account, and the second information being associated with at least one recent behavioral biometric signature of the operator collected by the mobile device within a set time range of the payment request, and the at least one historical behavioral biometric signature, wherein the at least one historical behavioral biometric signature and the at least one recent behavioral biometric signature each include at least one of a posture to hold the mobile device, and finger pressing characteristics, the second information comprising a determination result of whether the operator is an owner of the mobile device based on a comparison of the at least one recent behavioral biometric signature and the at least one historical behavioral biometric signature;
determining an identifier value corresponding to the second information according to a mapping relationship between the second information and the identifier value; and
generating, based on the identifier value, the first information, and the redundant number, the payment code, wherein at least one digit in the payment code corresponds to the identifier value.

2. The method of claim 1, further comprising:
activating an online identity verification process to the operator of the mobile device if the determination result is that a probability of the operator being the owner of the mobile device is lower than a set threshold, and the mobile device is in an offline payment state.

3. The method of claim 1, wherein, before generating the payment code based on the payment request, the method further comprising changing the mapping relationship between the second information and the identifier value.

4. The method of claim 1, wherein both of the at least one recent behavioral biometric signature and the at least one historical behavioral biometric signature further comprise at least one of a Remote Procedure Call (RPC) protocol request record and a browse log.

5. The method of claim 1, wherein the at least one recent behavioral biometric signature comprises a recent browse log, the at least one historical behavioral biometric signature comprises a historical browse log, and
wherein the second information comprises:
a determination result of whether the recent browse log is distinct from the historical browse log.

6. The method of claim 1, wherein the at least one recent behavioral biometric signature comprises a recent Remote Procedure Call (RPC) protocol request record, the at least one historical behavioral biometric signature comprises a historical RPC protocol request record, and
wherein the second information comprises:
a determination result of whether the recent RPC protocol request record is distinct from the historical RPC protocol request record.

7. A device comprises one or more processors and one or more non-transitory machine-readable memories coupled to the one or more processors and configured with instructions executable by the one or more processors to cause the device to perform operations comprising:
collecting at least one historical behavioral biometric signature;
storing the at least one historical behavioral biometric signature;
receiving a payment request from an operator of a mobile device; and
generating a payment code based on the payment request, wherein the payment code comprises a redundant number, wherein the generating a payment code based on the payment request comprises:
changing a value of the redundant number;
determining, based on the payment request, first information and second information, the first information being associated with a payment account, and the second information being associated with at least one recent behavioral biometric signature of the operator collected within a set time range of the payment request, and the at least one historical behavioral biometric signature, wherein the at least one historical behavioral biometric signature and the at least one recent behavioral biometric signature each include at least one of a posture to hold the mobile device, and finger pressing characteristics, the second information comprising a determination result of whether the operator is an owner of the mobile device based on a comparison of the at least one recent behavioral biometric signature and the at least one historical behavioral biometric signature;
determining an identifier value corresponding to the second information according to a mapping relationship between the second information and the identifier value; and
generating, based on the identifier value, the first information, and the redundant number, the payment code, wherein at least one digit in the payment code corresponds to the identifier value.

8. The device of claim 7, wherein the operations further comprises:
activating an online identity verification process to the operator of the mobile device if the determination result is that a probability of the operator being the owner of the mobile device is lower than a set threshold, and the mobile device is in an offline payment state.

9. The device of claim 7, wherein both of the at least one recent behavioral biometric signature and the at least one historical behavioral biometric signature further comprise at least one of a Remote Procedure Call (RPC) protocol request record and a browse log.

10. The device of claim 7, wherein the at least one recent behavioral biometric signature comprises a recent browse log, the at least one historical behavioral biometric signature comprises a historical browse log, and
wherein the second information comprises:
a determination result of whether the recent browse log is distinct from the historical browse log.

11. The device of claim 7, wherein the at least one recent behavioral biometric signature comprises a recent Remote Procedure Call (RPC) protocol request record, the at least one historical behavioral biometric signature comprises a historical RPC protocol request record, and
wherein the second information comprises:
a determination result of whether the recent RPC protocol request record is distinct from the historical RPC protocol request record.

12. A non-transitory computer-readable storage medium having instructions stored thereon executable by a processor to cause the processor to perform operations, comprising:
collecting, by a mobile device, at least one historical behavioral biometric signature;
storing, on the mobile device, the at least one historical behavioral biometric signature;
receiving, by the mobile device, a payment request from an operator of the mobile device; and
generating, by the mobile device, a payment code based on the payment request, wherein the payment code comprises a redundant number, wherein the generating a payment code based on the payment request comprises:
changing a value of the redundant number;
determining, based on the payment request, first information and second information, the first information being associated with a payment account, and the second information being associated with at least one recent behavioral biometric signature of the operator collected by the mobile device within a set time range of the payment request, and the at least one historical behavioral biometric signature, wherein the at least one historical behavioral biometric signature and the at least one recent behavioral biometric signature each include at least one of a posture to hold the mobile device, and finger pressing characteristics, the second information comprising a determination result of whether the operator is an owner of the mobile device based on a comparison of the at least one recent behavioral biometric signature and the at least one historical behavioral biometric signature;

determining an identifier value corresponding to the second information according to a mapping relationship between the second information and the identifier value; and generating, based on the identifier value, the first information, and the redundant number, the payment code, wherein at least one digit in the payment code corresponds to the identifier value.

13. The storage medium of claim 12, wherein the operations further comprise:

activating an online identity verification process to the operator of the mobile device if the determination result is that a probability of the operator being the owner of the mobile device is lower than a set threshold, and the mobile device is in an offline payment state.

14. The storage medium of claim 12, wherein, before generating the payment code based on the payment request, the operations further comprising changing the mapping relationship between the second information and the identifier value.

15. The storage medium of claim 12, wherein both of the at least one recent behavioral biometric signature and the at least one historical behavioral biometric signature further comprise at least one of a Remote Procedure Call (RPC) protocol request record and a browse log.

16. The storage medium of claim 12, wherein the at least one recent behavioral biometric signature comprises a recent browse log, the at least one historical behavioral biometric signature comprises a historical browse log, and wherein the second information comprises:

a determination result of whether the recent browse log is distinct from the historical browse log.

17. The storage medium of claim 12, wherein the at least one recent behavioral biometric signature comprises a recent Remote Procedure Call (RPC) protocol request record, the at least one historical behavioral biometric signature comprises a historical RPC protocol request record, and wherein the second information comprises:

a determination result of whether the recent RPC protocol request record is distinct from the historical RPC protocol request record.

\* \* \* \* \*